United States Patent [19]
Meissner et al.

[11] Patent Number: 6,070,001
[45] Date of Patent: May 30, 2000

[54] ADDRESSABILITY SYSTEM

[75] Inventors: Michael W. Meissner, Denver; Nancy L. Blankenship, Castle Rock, both of Colo.

[73] Assignee: CSG Systems, Inc, Englewood, Colo.

[21] Appl. No.: 08/696,108

[22] Filed: Aug. 12, 1996

Related U.S. Application Data

[63] Continuation of application No. 08/581,734, Dec. 29, 1995, abandoned.

[51] Int. Cl.[7] .................................................. G06F 13/00
[52] U.S. Cl. ........................................................ 395/200.33
[58] Field of Search .................. 364/DIG. 1, DIG. 2, 364/705.06, 710.04; 348/1, 2, 3, 4; 395/201, 230, 234, 200.01, 200.1, 200.16, 200.3, 200.33, 200.47

[56] References Cited

U.S. PATENT DOCUMENTS

| | | | |
|---|---|---|---|
| 4,455,619 | 6/1984 | Masui et al. | 345/509 |
| 5,289,371 | 2/1994 | Abel et al. | 705/5 |
| 5,293,620 | 3/1994 | Barabash et al. | 395/672 |
| 5,404,523 | 4/1995 | DellaFera et al. | 395/671 |
| 5,452,450 | 9/1995 | Delory | 707/10 |
| 5,572,442 | 11/1996 | Schulhof et al. | 364/514 |

*Primary Examiner*—Robert B. Harrell
*Attorney, Agent, or Firm*—Baker & McKenzie

[57] ABSTRACT

An addressability system is provided for use in a communications network. The addressability system provides an interface between a billing system and a controller which is linked between a headend and a customer's converter. The addressability system receives a controller-generic command from the billing system and retrieves data from a data storage system in response to the controller-generic command. Based on the retrieved dated, the addressability system converts the controller-generic command to a controller-specific command and passes the controller-specific command to the controller to enable the controller to address the converter. The commands serve a number of functions including enabling a converter to decode a selected service or event for a selected time length such as the duration of the event.

18 Claims, 3 Drawing Sheets

ADDRESSABILITY SYSTEM

CROSS-REFERENCE TO RELATED APPLICATION

This application filed under 37 C.F.R. §1.53 is a continuation application of U.S. patent application Ser. No. 08/581,734, now abandoned, entitled "Addressability System," filed Dec. 29, 1995, by Michael W. Meissner and Nancy L. Blankenship.

FIELD OF THE INVENTION

The present invention is related to addressability systems in general and, more particularly, to an addressability system for a cable communications system.

BACKGROUND

Addressability systems for use in cable communication systems are generally known. Addressability is typically regarded as the administration and control of addressable devices. Within the field of cable television, for example, an addressability system may enable and control the distribution of cable services and allow the cable system to control and administer which cable products a customer may purchase and/or view.

A typical cable communications system includes several basic components such as a service provider, a headend, a billing system, a controller and a customer's converter. Normally, the headend receives a signal sent by a service provider, which may send the signal, for example, via an uplink to a satellite and a downlink from the satellite to the headend. At the headend, the signal may be manipulated, for example, by being scrambled, encrypted and having authorization codes attached thereto. The billing system typically manages products and services, customers and addressable equipment such as the converters and controllers. A customer's request for a certain service or product is normally forwarded to the billing system. The billing system sends instructions to the controller, which configures the converter in accordance with the instructions. The controller also communicates with the headend to receive the proper authorization information needed for the particular configuration. This information is sent to the converter. The converter also receives the signal and compares information on the signal to corresponding authorization from the controller. Based on the comparison, the customer may or may not be able to view the signal.

The addressability system may be viewed as the interface between the billing system and the controller. Known addressability systems receive information from the billing system and send it to the appropriate controller to enable the controller to properly configure the converter. A conventional addressability systems may include an addressability server linked to the billing system. The addressability server receives information from the billing system and passes it to controller processors, which forward the information to the appropriate controller. Known systems are hardware driven and the packaging of enabling information is integrated with the billing system. The billing system gathers data corresponding to the customer and request, and packages the data into a format for a particular type of controller. Different types of controllers include, for example, controllers manufactured by Jerrold, Scientific Atlanta, Zenith, Tocom and Oak.

One problem with conventional addressability systems is that the information received by the addressability server has already been packaged for a specific controller. Controllers are limited in the number of hardware links they can support. Because packaged information received by the addressability server is controller specific, and due to hardware limitations, a dedicated link is required between the addressability server and the controller. Since the number of links for a controller are limited, the addressability system can only support a limited number of controller types. The limit on the supportable controller links, together with the hardware limitations, also results in limits on the number of priority levels which can be accepted by a given controller. Thus, prior addressability systems are limited in their hardware and software scalability.

These problems are examples of difficulties encountered by the prior art. It will be appreciated by those having ordinary skill in the art that other problems exist with known addressability systems.

SUMMARY OF THE INVENTION

It is an object of the present invention to overcome problems associated with known addressability systems.

It is another object of the present invention to provide an addressability system having a high level of hardware and software scalability as compared to known addressability systems. Preferably, the scalability of an addressability system according to the present invention is unlimited.

It is another object of the present invention to provide an addressability system for use in a communications network, which can support an unlimited number of controllers.

It is another object of the present invention to provide an addressability system for use in a communications network, which can support an unlimited number of priority levels per controller.

It is another object of the present invention to provide an addressability system for use in a communications network, wherein the addressability system receives controller-generic information from a billing system and passes controller-specific information to a controller.

To achieve these and other objects, an addressability system is provided in which controller-generic information is received from a billing system. The addressability system includes an addressability server connected to a plurality of controller processes via a queue. The addressability server is adapted to receive the controller-generic transaction and identify an appropriate one of the controllers which should receive the transaction. The addressability server sends the transaction to the appropriate controller process, which packages the transaction into a controller-specific command for the appropriate controller. The information is passed to the controller via a communications interface.

Further aspects, features and advantages may be understood by reference to the detailed description of the preferred embodiment together with the appropriate drawings.

DETAILED DESCRIPTION OF THE PREFERRED EMBODIMENTS

The present invention generally provides a highly-scalable addressability system which is software-based. The addressability system receives generic information from a billing system and converts the information into a controller-specific packet of information, which is passed onto a compatible one of a plurality of different controllers.

Figure 1:
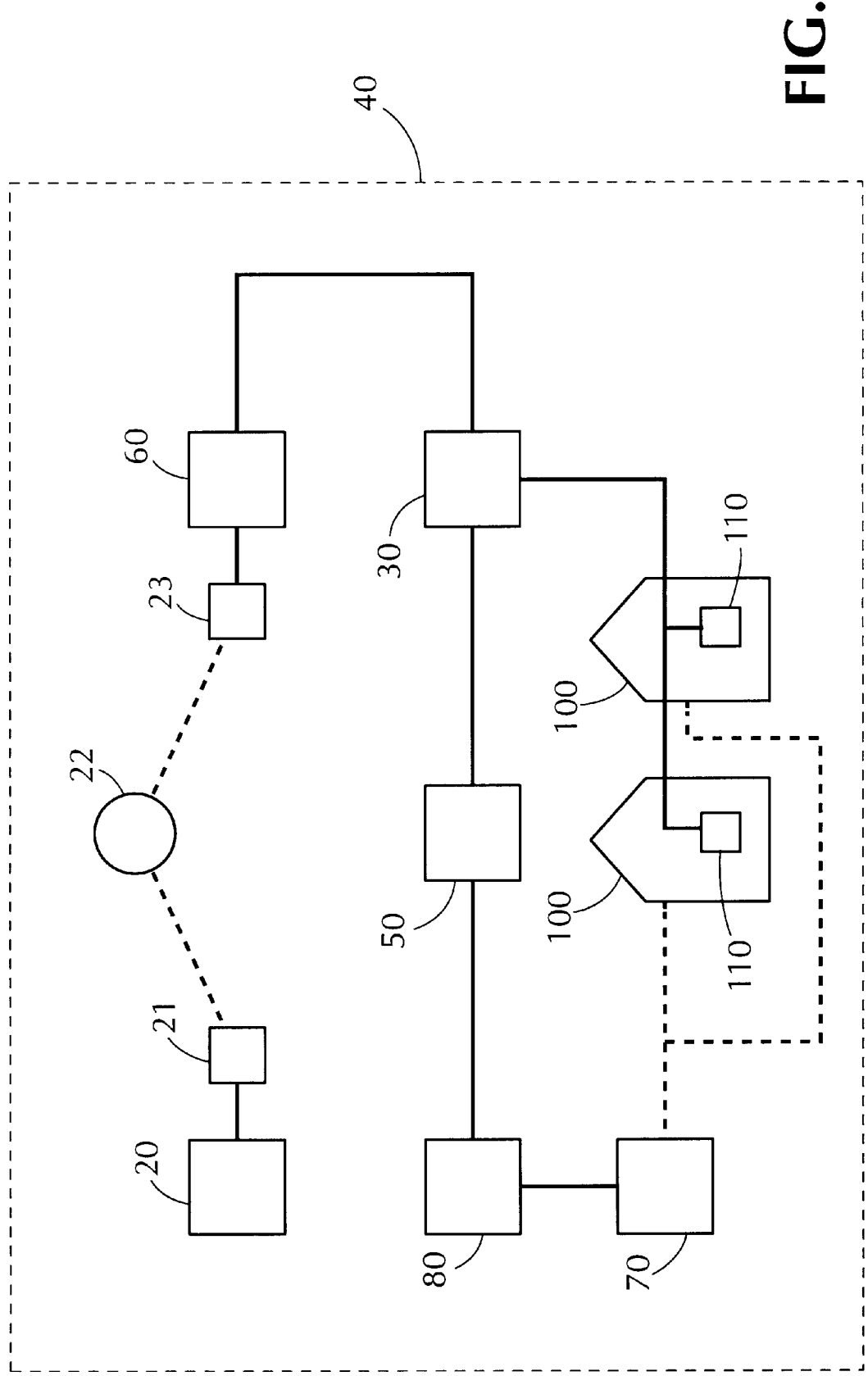
FIG. 1 is a block diagram of a communications network.

As shown in FIG. 1, an addressability system 50 is provided between a billing system 80 and a controller 30 of a communications network 40. The addressability system is responsible for the administration and control of the addressable devices within communications network 40. Thereby, addressability system 50 is capable of enabling and controlling the distribution of cable services and allowing the cable system to control and administer which cable products a customer may purchase and/or view.

In general, communications network 40 operates as follows. Service provider 20 sends a signal to a headend 60. The signal may be sent, for example, by a satellite uplink 21 through a satellite 22, to be received by a satellite downlink 23, which then passes the signal to headend 60. Alternatively, the signal may be sent via a direct link, for example, over fiber optics cable, coaxial cable, a telephone line or some other direct link. A sonnet link may also be used. Further, any means for transmitting the signal from service provider 20 to headend 60 may be used in connection with the present invention.

Figure 2:
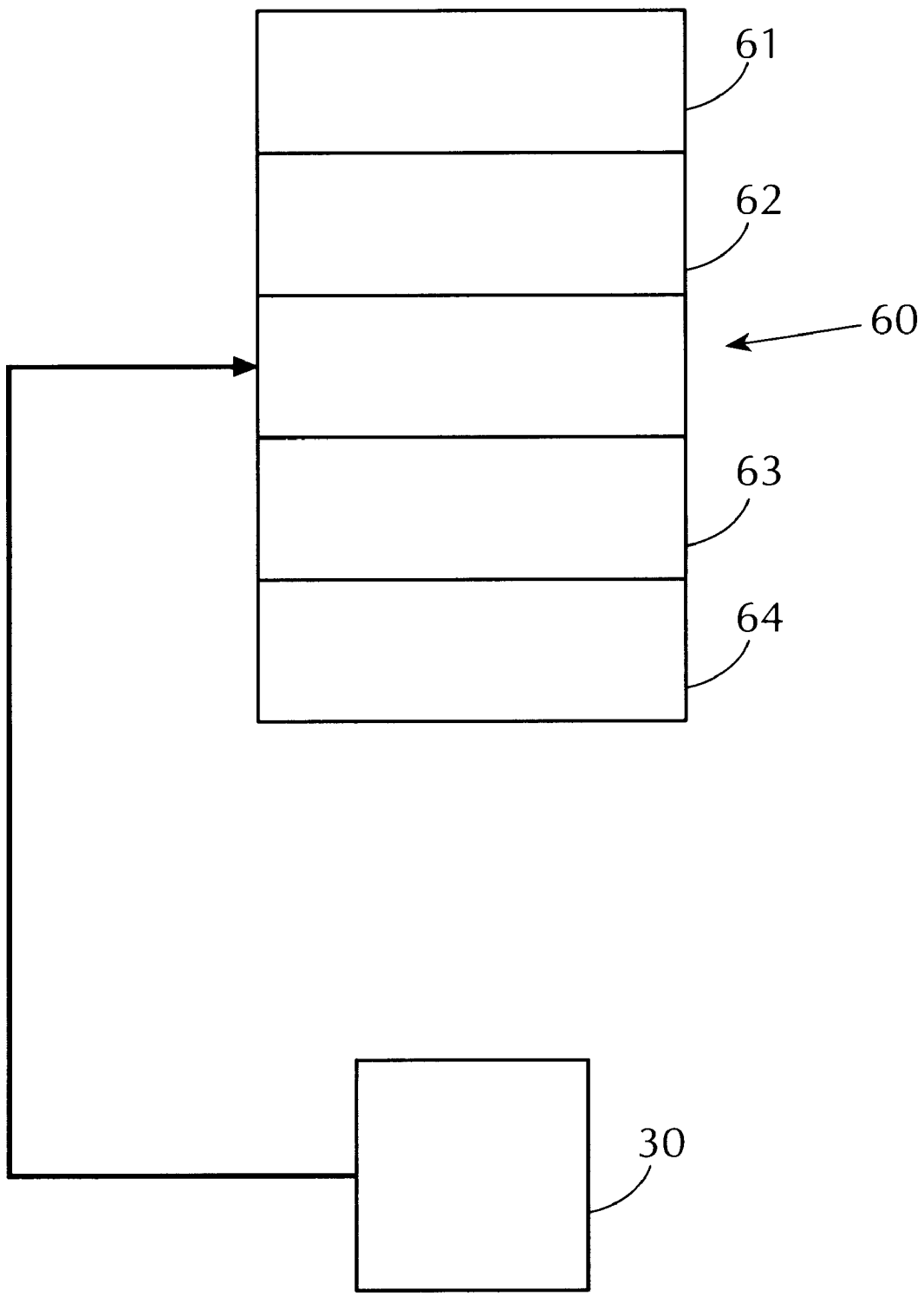
FIG. 2 is a diagram of a headend of the communications network of FIG. 1.

As shown in FIG. 2, the headend 60 includes a plurality of components which cooperate to receive, modify and distribute the signal received from service provider 20. Headend 60 may include, for example, a transponder receiver 61, such as an Integrated Receiver Decoder (IRD), for receiving the signal. Preferably, transponder receiver 61 is capable of receiving a digital signal and converting it to an analog signal. Transponder receiver 61 should also include encryption keys for encrypting the received signal. The encryption keys allow transponder receiver 61 to attach one or more authorization codes (e.g., authorization TAGs) to the signal. A modulator 62 may be provided for modulating (e.g., stepping up or stepping down) the signal received from transponder receiver 61. Modulation may be necessary, for example, to change a relatively high frequency of an incoming signal to a frequency suitable for transmission through the remainder of communications network 40. Headend 60 may also include a scrambler 63 for scrambling the signal. Scrambling techniques may include, for example, frequency modulation, amplitude shifting and vertical blanking. Channel-based scrambling techniques may be used. A combiner 64 is provided for recombining the signal with other signals and for placing the combined signals on a distribution trunk for delivery to the remainder of communications network 40. The distribution trunk can be any suitable medium for distribution of signals including, for example, coaxial cable or fiber optic lines.

Referring again to FIG. 1, communications network 40 also includes a request receiving system 70 and a billing system 80. The request receiving system 70 receives a request from a customer 100. Preferably, the request is made via telephone, but other media may be used. For instance, a graphic user interface may be provided at the customer's location to allow the customer to enter requests in an interactive environment. Request receiving system 70 preferably has several components including an Automatic Number Identification (ANI) system, an Audio Response Unit (ARU), a Voice Response Unit (VRU), and a Dialed Number Identification Service (DNIS) system. Preferably, the request receiving system 70 is capable of receiving a request from a customer 100 and modifying the customer's input to produce a message which can be sent to and received by the billing system.

The billing system 80 is linked to the request receiving system 70 and is preferably capable of identifying the requested transaction from the message sent from the request receiving system. Billing system 80 can then access necessary information which will eventually be sent to the appropriate controller via the addressability system 50. Billing system 80 preferably accesses this necessary information via a distributed data system. The distributed data system stores such necessary information as customer identification numbers, event identification numbers, controller identification numbers, and converter serial numbers. Billing system 80 is adapted to transmit information to addressability system 50. Preferably, the information at this point in the system is not formatted for any particular type of controller.

Addressability system 50 receives the transaction request information from billing system 80 and formats into an addressability packet the information for the particular type of controller which serves the customer making the request. Addressability system 50 then sends the addressability packet to the appropriate controller 30.

Controller 30 receives the addressability packet from addressability system 50. Controller 30 manages a plurality of addressable converters 110. Different type of controller which may be used in conjunction with the addressability system of the present invention include, for example, controllers manufactured by Jerrold, General Instruments, Pioneer, Primestar, Scientific Atlanta, Zenith, Tocom and Oak. A controller supporting the National Digital TV Center/Authorization Center (NDTC/AC) may also be used. This type of controller is also known as TAC. Additionally, controller-type systems which are not computer-based, such as HITSOPS, may be supported. Moreover, any addressable controller may be used within the scope of the present invention. Likewise, converters 110 may be any of those manufactured by the above manufacturers as long as they are compatible with the controller to which they are linked. Controller 30 receives a formatted addressability packet from the addressability system 50 and is thereby enabled to provide a signal to the appropriate converter, for the requested event, for the appropriate length of time. Controller 30 receives the signal from headend 60 and passes it to the appropriate controller based on the parameters contained within the addressability packet. Controller 30 also interfaces with headend 60 to receive scrambling information and authorization coding. Controller 30 translates this information into messages which the converter can understand, thereby enabling the converter to decode and descramble the signal so that it may be viewed by the customer.

The converters 110 are preferably located at the customer sites and are adapted to decode scrambled signals provided they have been authorized to do so via the message sent from the addressability system to the converter via the controller. Authorization codes are received by the converter and are placed in memory. When the customer attempts to view a scrambled signal, the converter compares an authorization code superimposed on the signal to the code stored in memory. If a match exists, the converter decodes the scrambled signal. If a match does not exist, the signal remains scrambled and the customer is unable to view it.

Figure 3:
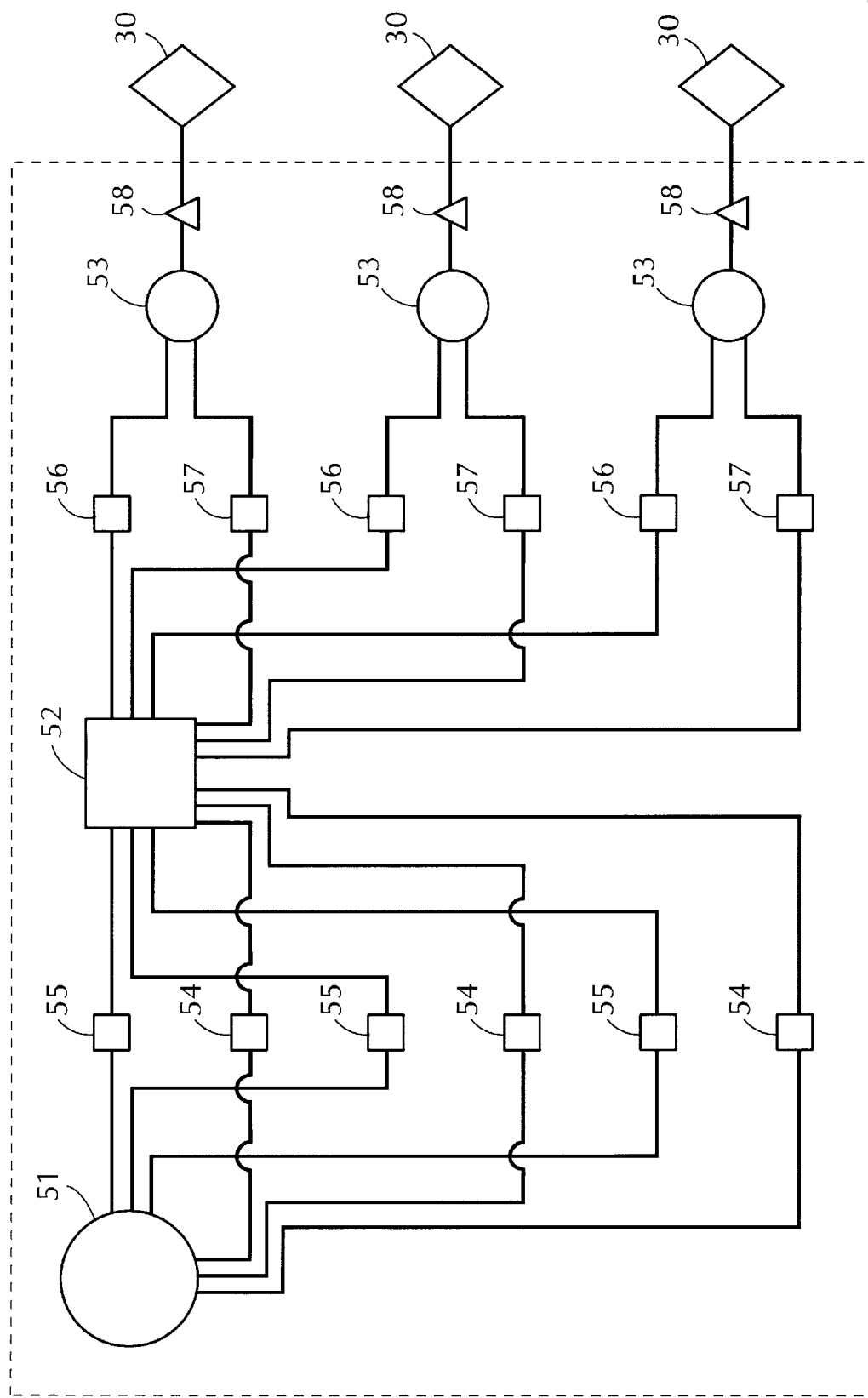
FIG. 3 is a block diagram of an addressability system according to the present invention.

The details of addressability system 50 will now be described. Referring to FIG. 3, addressability system 50 includes an addressability server 51, a queue manager 52 and a plurality of controller processes 53. A plurality of addressability server input and output queues 54 and 55 link the addressability server 51 to the queue manager 52. A plurality of controller processor input and output queues 56 and 57 link queue manager 52 to controller processes 53. The addressability system may also include a communications interface 58 to link the controller processes to the controllers. Preferably, an addressability server input and output queue, and a controller process input and output queue, exist for each controller. Alternatively, more than one addressability server input and/or output queue, or more than one controller process input and/or output queue may be provided for each controller. Also, the system may incorporate more than one queue manager. For example, a first group of controllers could be serviced by a first queue manager and a second group of controllers could be serviced by a second queue manager. Further, a controller process preferably exists for each controller. As discussed above, the controllers may be different types. Also, the controllers may be distinctive from one another due to their geographic location.

The addressability server receives a request message from the billing system. From the message data, the addressability server identifies which of the plurality of controllers is the controller supporting the target converter. The addressability server places the message in the appropriate one of the plurality of addressability server output queues that is associated with the identified controller. This output queue notifies queue manager 52 of the existence of the request message. Queue manager 52, via the appropriate controller process input queue, notifies the associated controller process of the existence of the request message. The controller process input queue retrieves the request message from queue manager 52 and passes it to the controller process. The controller process uses the request message information to build a command, or addressability packet, to be sent to the identified controller. This addressability packet is sent to a communications interface 58 for delivery. The identified controller receives the message from the communications interface 58.

Preferably, the controller is capable of distinguishing between a valid and an invalid command. If an invalid command is received, the controller should be capable of sending an error message back to the addressability server. If the command is valid, the controller executes the command and should be capable of sending a status message back to the addressability server. Messages sent from the controller are preferably passed to the addressability system via the communications interface. The controller process receives the message and passes it to the queue manager via the controller process output queue. The queue manager passes the message to the addressability server via the addressability server input queue. Preferably, the controller process is adapted to execute a retry function for error messages. In this situation, the controller process may receive the error message and, as a result, examine the original addressability packet for communication or protocol errors. If such an error exists, the controller process rebuilds the packet and sends it to the controller. This is repeated up to a predetermined number of attempts. Transmission of formatted messages (addressability packets) to the controller can take place over any suitable type of transmission medium in any type of networking environment including, for example, point-to-point, LAN, WAN or switched network. Communication may be achieved using any suitable type of protocol including, for example, asynchronous, synchronous, DCE, ASCII, IEEE 802.3, Internet or Ethernet protocols. Additionally, communication may occur in a one-way, two-way or digital environment.

The addressability system is preferably adapted to receive controller-generic commands from the billing system. In other words, the request message sent to the addressability system from the billing system is in a format generic to any of the supported types of controllers and converters. For example, a controller-generic message may include the converter serial number, event identification number and customer address. From these generic pieces of data, the addressability system can interrogate other data sources (including the billing system) for other pieces of information necessary for creating a controller-specific message. For instance, based on the converter serial number, the addressability system may retrieve the converter type and corresponding controller type (e.g., via a stored controller identification number). This allows the addressability system to determine the specific commands and command formats necessary to enable the controller to understand the request message. From the event identification number, the addressability system may retrieve information relative to authorization or may format the message so that the controller can provide authorization data to the converter. A customer address can be used by the addressability system, for example, to assign a priority level to a request. For example, if a particular customer repeatedly requests a certain type of Pay-Per-View event, a high priority can be attached if, in the instant transaction, the customer is requesting that type of event.

It should also be noted that communication from the controller to the billing system can also be achieved, for example, to send error and status messages. In this instances, controller-specific messages from the controller are passed to the addressability system. The addressability system detects the messages and converts them into a controller-generic format which may be understood by the billing system.

One advantage of an addressability system according this embodiment is that of increased hardware and software scalability over the prior art. For instance, because messages are controller-generic up to the point the message reaches the addressability system, any number of controllers may be incorporated into the system with one addressability system. In one embodiment, the addressability system is capable of interfacing with an infinite number of controller types, preferably at least five, while only occupying a single link for each controller. The remaining available links for each controller can then be used to provide networking or other functions. Even more preferably, the addressability system is capable of supporting at least 13 controller types. Related to this aspect is the ability of the addressability system to support any number of geographic locations, whether the controllers at the various geographic locations are of different or similar types. Also, with a given number of controllers, more controller processes may be added to handle increased controller performance or message traffic. With respect to software scalability, the system is capable of handling changes in the number of software links between the addressability server and the plurality of controllers without reconfiguring the remainder of the communications network.

Another advantage of the addressability system is that the controller-generic nature of commands entering the addressability system enables sophisticated message priority schemes which are more advanced than those used in prior system. First, more levels of priority (as many as desired) can be attached to a request message. In one embodiment in which four controllers are linked to the addressability server, the addressability system can accommodate Second, the priorities can be shifted to any desired orientation within a queue manager, or within the addressability server input and output queues or the controller process input and output queues. Third, the priority levels can be shifted among the various queues. For example, a priority command could be shifted from one queue manager to another queue manager within the addressability system. Moreover, prioritization may be based on any predetermined criteria such as the customer address, the event time, or the type of controller. Other criteria may be used. Further, the criteria may be based on controller-generic or controller specific information. Hardware and software scalability is enhanced by the software-based nature of the addressability system. Because the functions of the addressability system such as data reception and retrieval, message formatting and queuing are controlled by software, typical hardware limitations do not exist.

The addressability system 50 preferably supports any of a number of different requests or transactions. Supportable transactions include, among others, adding or deleting equipment; adding, deleting or changing services; changing the status or configuration of existing equipment; downloading or uploading and event schedule or controller inventory; authorizing an event (e.g., a Pay-Per-View event); deauthorizing an event, cancelling an event; or removing an event from the schedule or inventory. Other transactions include any transactions already practiced in known communications systems. Additionally, the addressability system is preferably adapted to support a number of services including, among others, Home Box Office (HBO) events; and Pay-Per-View events; converter functions (e.g., remote control). Other supportable services include any services provided in known communications systems. Additionally, devices other than converters can be incorporated into the present invention to benefit from the these functions. These other devices include, for example, DMX tuners, Interactive adapters, and SEGA game adapters. Other supportable devices include any devices which are used in known communications systems. Another transaction which may be achieved is known as a global refresh. In this instance, the system authorizes services in accordance with a customer's billing profile. The transaction can be used to re-initialize a customer's equipment, for example, after a power outage or some other system failure.

Some of these transactions will now be described in greater detail. With respect to a command to add equipment, generally the addition of equipment occurs when the equipment (e.g., a converter) is initialized at a service center and/or when installed at a customer location. Equipment may be initialized with system default for volume control, remote control, channel mapping, and any other services preselected as system defaults. When adding a converter at a customer's home, the converter box may be assigned to a customer account and authorizations requested or purchased by the customer may be set. To add equipment, the communications network can provide the addressability system with such controller-generic information as a transaction identification number, a controller identification number, a converter serial number and/or PROM (programmable read only memory) number, converter identification number and service authorization codes. The addressability system takes this data, formats it and sends it to the correct controller. If the controller accepts the command, a positive return status message is sent by the controller to the return status queue. If an error occurs, an error message will be returned to the return status queue.

With respect to a command to delete equipment, the addressability system may receive a transaction identification number, a transaction type, a converter identification number, a converter type, a converter serial and/or PROM number, a headend identification number and a controller identification number. The addressability system can format this controller-generic information for the appropriate specific controller type. When the status for this request is available from the controller, it is reformatted into a generic format with its associated transaction identification number and placed in a return status queue. Another component in the communications network may then request the status from the addressability system. If the status indicates successful deletion of the converter from the controller's inventory, the network must then update databases accordingly. If the status indicates failure, the network must take appropriate action.

A request to add, delete, or change services is similar to adding equipment, except that it is done after the converter has been placed into service. The data required for this type of addressable transaction is preferably identical to the data required for a command to add equipment. A customer may request that services or subscriptions be added, deleted, or changed. Depending upon equipment type and model, franchise standards, and customer preferences, the controller might support one or more services including, for example, volume control, remote control, last or favorite channel, channel skipping, parental blocking, wrap-around-point, and HBO. In another scenario, a customer may be delinquent in their payment such that services and subscriptions must be terminated. When such an event occurs, a message may be sent to the addressability system requesting a modification of services. The addressability system formats a message for the appropriate controller that incorporates the requested modifications to a specific converter and sends the command message to the controller. The controller preferably verifies the command, signals the converter, and returns a status message.

With respect to a request to change the status of a particular piece of equipment, the status of equipment may be changed at both a customer location and within inventory. A customer's converter, for example, may have its status changed from "enabled" to "disabled" for payment or non-payment of their bill. In this case, the services stay loaded in the customer record, but when the customer tries to view, all channels are mapped to a disconnect barker. Alternatively, the status of a converter might be changed to "enabled" after being repaired.

There are at least two orientations for a global refresh command—system initiated and controller initiated. With respect to controller initiated refreshes, a network may be designed such that the controller is constantly refreshing authorizations of its controller inventory and cycling constantly through the network databases to reauthorize its converters. This process is preferably assigned a low priority and is only done when the controller is not busy handling requests from the billing system. System initiated refreshes are preferably started by the network (e.g., the billing system) and are used to ensure synchronization of the billing system records with the controller records.

The addressable controller and the billing system preferably maintain a consistent database of addressable converters. This consistency is maintained through commands to add or delete converters. In addition, some addressable controllers allow for their databases to be downloaded or uploaded from the billing system through the addressability system. These features allow the network to force the databases to be consistent and to verify consistency, respectively, at a selected point in time. Those addressable controllers that do no provide an automated upload/download capability must be manually loaded and verified.

Event schedules within the billing system and the addressability system are preferably consistent. Keeping consistent event schedules may be either a manual or an automated process, depending on the addressable equipment capabilities. In the event that the controller equipment cannot be automatically downloaded with event schedules, a manual loading of an event schedule is preferably accommodated. Preferably, the billing system can send the addressability system the event schedule for the selected equipment and the addressability system can create a paper listing or diskette. The paper listing or the diskette can be sent to a franchise, ANI/ARU, or EPG operator for manual loading. If a controller can be automatically downloaded over a wire link, the network is preferably adapted to send the addressability system the event schedule for the selected equipment. Also, the addressability system may be adapted to generate the appropriate event schedule message(s) for that controller. Controller equipment that has download capability might have an event schedule upload capability. In this case, the network preferably sends the addressability system a transaction requesting an upload of the controller event schedule. If that transaction is valid for the addressability equipment, the addressability system sends the appropriate command to the controller, collects the returned data, and places it into one or more generic return status messages that the network can request and handle.

With respect to a command to authorize an event, a component in the network (e.g., billing system) may create transactions and pass these transactions to the addressability system. These transactions may be labeled as high priority event and, as such, the network should supply all of the information necessary to authorize the event without the need for the addressability system to obtain additional information from the distributed data system. The addressability system accepts the transaction and, depending on the controller identification number, adds the command to the appropriate controller process input queue. The controller process pulls the transaction from its input queue and uses the transaction to create a command message. The command message is sent to the controller which accepts the command message and acts on the event authorization by enabling the event on the appropriate converter box if the authorization is valid for that controller. If valid, the controller returns a status message indicating the command was valid. On the other hand, if the command is invalid, the controller returns a status message containing one or more error messages. The status message is returned to the addressability system.

When a customer reports a viewing problem, the event order may be reauthorized to prevent purchase cancellation or credit. Reauthorizing an event entails resending the authorization sequence without incurring additional charges on the customer account. An order taker processes the reauthorization before canceling an event or scheduling a service call. The addressability system preferably handles a reauthorization identically to a standard event authorization.

The billing system may determine which requests are pending fulfillment of a customer's account and, therefore, might be cancelled. The user may determine which transaction should be cancelled and may initiate a cancel event transaction and transaction id. The billing system may create the transactions that cancel an event authorization and pass these transactions to the addressability system. The addressability system accepts the transaction and, depending on the controller identification, sends it to the appropriate controller process input queue. The controller process pulls the transaction from its input queue and uses the transaction to create a controller-specific command message. The command message is sent to the controller which accepts the command message and acts on the event cancellation by removing the event's authorizations from the appropriate converter box.

After an event is over, or after it has been cancelled, the event may be deauthorized from all the converters in the network. Depending on the addressable equipment, the controller may or may not automatically initiate the event deauthorization process. In most cases, the controller uses its own internal process to notify all the converters it has authorized for an event to remove the authorization when the event has concluded. If it is not handled automatically, the network may collect a list of users that were authorized and create transactions to deauthorize (turn off) the event. These transactions are preferably sent to the addressability system for action. This type of deauthorization process preferably proceeds just as the cancel event process, except that multiple transactions are handled. Further, these transactions are normally considered to be high priority events and, as such, a network management system may supply all of the information necessary to deauthorize the event without the need for the addressability system to obtain additional information from a the distributed data system.

According to another feature of the invention, a graphic user interface (GUI) may be provided (e.g., at the billing system location or at the customer site). The GUI is linked to the addressability system to allow a user to monitor the status of commands within the addressability system. Commands which have passed to other systems or devices exterior to the addressability system can also be monitored via the links between the particular exterior system or device and the addressability system. For example, a user can monitor such items as request messages, formatted addressability packets, execution of formatted commands by the controller, and error messages.

According to another aspect, request messages are recorded in a transaction log which is linked to the addressability system. The addressability system can enter into the transaction log information such as date, time controller identification, customer address, transaction type, converter serial number and controller identification. The transaction log can be used for several purposes including, without limitation, reauthorization of events or services, customer service, billing, or maintenance and trouble shooting.

Although the present invention has been described in connection with the preferred embodiments, the invention is not limited thereto. It will be understood by those of ordinary skill in the art that variations and modifications can be easily made without departing from the scope and spirit of the present invention as defined by the following claims.

What is claimed is:

1. An addressability system for use in a communications system having a data storage system and at least one controller, the addressability system comprising:

an addressability server, the addressability server being linked to the data storage system and adapted to retrieve data from the data storage system in accordance with a controller-generic message; and a plurality of controller processes, each controller process being linked to and disposed between the addressability server and a corresponding controller, wherein:

at least one of the plurality of controller processes is adapted to receive the data and the controller-generic message from the addressability server, the at least one controller process is adapted to convert the controller-generic message into a controller-specific message based on the data, and the at least one controller process is adapted to send the controller-specific message to the corresponding controller.

2. The addressability system of claim 1 comprising a first queue system linked to and disposed between the addressability server and the plurality of controller processes, the queue system being adapted to receive a controller-generic message from the addressability server and to transmit the controller-generic message to the at least one controller process.

3. The addressability system of claim 2 wherein a first priority level is selected from a plurality of priority levels and assigned to a first controller-generic message based on one or more predetermined criteria, and wherein the first queue system is further adapted to recognize the first priority level.

4. The addressability system of claim 3 wherein the first queue system is adapted to change the first priority level to a second priority level selected from the plurality of priority levels.

5. The addressability system of claim 3 wherein the plurality of priority levels includes more than twelve priority levels.

6. The addressability system of claim 3 wherein the queue system is adapted to recognize more than twelve priority levels.

7. The addressability system of claim 2 further comprising a second queue system linked to and disposed between the addressability server and the plurality of controller processes, and wherein the addressability system is adapted to relocate the controller-generic message from the first queue system to the second queue system.

8. The addressability system of claim 1 wherein the at least one controller has a predetermined number of available hardware links, and wherein the plurality of controller processes comprises a number of controller processes which is greater than the predetermined number of available hardware links.

9. The addressability system of claim 1 wherein the addressability server is adaptable to be linked to more than twelve controller processes.

10. A communications network comprising:
at least one headend, the at least one headend being adapted to receive a signal;
at least one customer station, the at least one customer station being linked to the at least one headend;
at least one controller, the at least one controller being linked to and disposed between the at least one headend and the at least one customer station and being adapted to receive the signal from the at least one headend, manipulate the signal and pass the signal to the at least one customer station;
a billing system, the billing system being linked to the at least one controller;
an addressability system, the addressability system being linked to and disposed between the billing system and the at least one controller; and
a data storage system, the data storage system being linked to the addressability system,
wherein the addressability system is adapted to receive a controller-generic message from the billing system, access data from the data storage system based on the controller-generic message, convert the controller-generic message to a controller-specific message based on the data and pass the controller-specific message to the at least one controller to permit the at least one controller to augment the signal.

11. The communications network of claim 10 wherein the addressability system comprises an addressability server linked to the billing system and a plurality of controller process linked to and disposed between the addressability server and the at least one controller.

12. The communications network of claim 11 wherein the addressability system further comprises at least one queue system linked to and disposed between the addressability server and the plurality of controller processes.

13. The communications network of claim 12 wherein the queue system is adapted to recognize a priority level is selected from a plurality of priority levels and assigned to the controller-generic message based on one or more predetermined criteria, and wherein the queue system is adapted to recognize the priority level.

14. The communications network of claim 13 further comprising a plurality of hardware links between the at least one controller and the addressability system, and wherein the number of the plurality of priority levels is variable independent of the number of the plurality of hardware links.

15. The communications network of claim 11 further comprising a plurality of hardware links between the at least one controller and the addressability system, and wherein the number of the plurality of controller processes is variable independent of the number of the plurality of hardware links.

16. A method of sending commands from a billing system to a controller in a communications network comprising the steps of:
receiving a controller-generic message from the billing system;
accessing data from a data storage system in response to the controller-generic message;
converting the controller-generic message to a controller-specific message; and
passing the controller-specific message to the controller.

17. The method of claim 16 further comprising the step of assigning a first priority level to the controller-generic message.

18. The method of claim 17 further comprising the step of changing the first priority level to a second priority level.

* * * * *